F. B. MUELLER.
TRAP OR WATER SEAL.
APPLICATION FILED NOV. 21, 1910.
1,096,385.
Patented May 12, 1914.
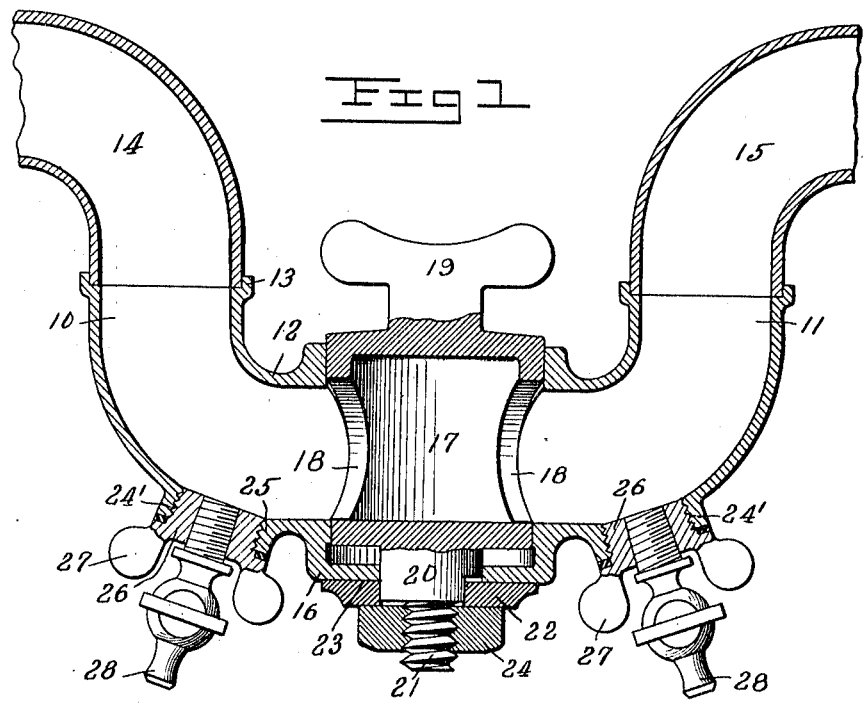
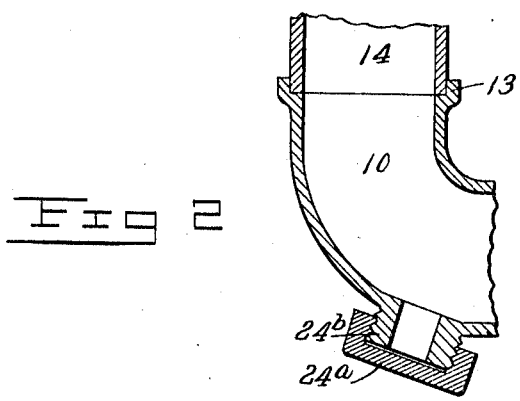

UNITED STATES PATENT OFFICE.

FRED B. MUELLER, OF DECATUR, ILLINOIS, ASSIGNOR TO H. MUELLER MFG. CO., OF DECATUR, ILLINOIS, A CORPORATION OF ILLINOIS.

TRAP OR WATER SEAL.

1,096,385. Specification of Letters Patent. Patented May 12, 1914.

Application filed November 21, 1910. Serial No. 593,547.

*To all whom it may concern:*

Be it known that I, FRED B. MUELLER, a citizen of the United States, residing at Decatur, in the county of Macon and State of Illinois, have invented new and useful Improvements in Traps or Water Seals, of which the following is a specification.

My present invention relates to certain new and useful improvements in traps or water seals such as are very largely employed in connection with sinks, basins and house plumbing generally, to keep sewer gas from entering the premises through the pipe connections with the sewer.

The prime object of the invention is to provide a highly satisfactory trap or water-seal with simple and readily operable means whereby either leg of the trap may be drained without permitting sewer gas from entering the house, and whereby either leg of the trap and its associated pipe connections may be readily flushed and cleansed without disconnecting or disturbing the trap or its connections.

To these and other ends the invention resides in the features of construction and arrangement of parts herein shown and described and then more definitely pointed out in the claim.

In the annexed sheet of drawing which is illustrative of a preferred embodiment of the invention,—Figure 1, is the trap or water-seal in vertical section, and Fig. 2, represents a slightly modified construction of one feature of the invention.

The trap proper is preferably in the form of a U-casting, comprising the inlet leg 10, outlet leg 11 and an intermediate connecting portion 12, the end of each leg being preferably provided with an outstanding flange 13, to receive the ends of the pipes 14 and 15, coming from and leading to the sink and sewer respectively.

The intermediate connecting portion 12, of the trap has formed therewith a casing 16, in which is rotatably mounted a hollow turning plug 17, having a single through passage 18, which may be brought into register with the inlet and outlet legs 10 and 11, of the trap, or which may be turned to close the communication between these legs. The turning-plug 17, is preferably arranged vertically and has at its upper end a handle, which in the instance shown, is in the form of wings 19, said wings preferably extending in line with the through passages 18, and thus serving to indicate to the operator the direction of the passages so that the open or closed position of the plug may be readily determined. The lower end of the plug-valve 17, is provided with a smooth portion 20, and a threaded portion 21, the smooth portion being of D or other appropriate shape in outline to which is locked or keyed a washer 22, said washer being arranged outside and bearing against the lower flat wall 23 of the casing 16, and rotatable with the plug-valve and relatively to said wall 23. A nut 24 is screwed upon the threaded portion 21 of the valve and this in conjunction with the washer 22, serves to prevent accidental withdrawal of the valve and also serves to hold the latter tightly to its seat.

Upon opposite sides of the valve casing portion of the trap and at the base of the legs 10 and 11, the said trap is provided with internally or externally threaded openings 24', each formed in a boss 25, formed integral with and depending from the underside of the said leg-portions. A screw closure 26, is screwed in each of said openings 24', each closure having a threaded opening therethrough and provided on its outer end with wings 27, by which the said closure may be readily inserted and removed. By referring to the drawing it will be seen that the inner end of each closure 26, lies substantially flush with the inner wall surface of the trap. The purpose of this is to obviate, as much as possible, the presence in the construction, of cavities or pockets in which slime, sediment or other foreign matter could collect such as would render the trap foul and unsanitary.

A pet-cock 28, is screwed in the threaded opening of each screw closure 26, as shown, the purpose of the pet-cock being to drain either side of the trap when desired, and as will be apparent, either leg of the trap may be drained independently of the other, and during the draining operation escape of sewer gas may be prevented by closing the turning-plug 17.

By preference I make the screw-threaded openings 24', of standard size so as to receive a standard sized coupling attached to a hose through which water for cleansing purposes may be allowed to flow or discharge. Instead of making the closure 26 in the form of a plug that screws into the openings 24′, obviously said closure may be in the form of a cap 24ª, Fig. 2, screwed onto the externally screw-threaded collar 24ᵇ, said collar being of standard size to receive a standard internally threaded coupling member.

It will be apparent from the foregoing description and drawing that either or both legs of the trap may be drained by opening either or both of the pet-cocks, and when it is desired to flush and cleanse the trap either of the plugs 26, may be removed and a hose coupled thereto through which the cleansing and flushing fluid may be forced. Obviously by properly positioning the plug valve 17, either leg of the trap may be flushed or cleansed independently of the other, and the flushing or cleansing fluid may be forced up into the sink; out into the sewer connection or out through either of the plug-openings or through the pet-cocks. It will thus be seen that I provide a trap or water-seal that is thoroughly sanitary in that it may be easily and quickly cleansed of all foreign matter and may be drained when desired in order to prevent freezing and when drained may be closed against the passage therethrough of sewer gas.

I do not wish to be understood as limiting myself to the precise construction and arrangement of parts herein shown and described except as I may be limited by the terms of the appended claim.

What I claim is:

In a trap the combination with an integral casting of U-form having a central valve casing and lateral branches leading from the valve casing, a turning plug in the valve casing adapted to close communication between the branches, the casting having drainage openings in the branches at either side of the valve casing, removable closures in said drainage openings, and drainage cocks carried by the closures whereby either of said lateral branches may be drained independently of the other and without removing said closures.

In testimony whereof I have hereunto set my hand in presence of two subscribing witnesses.

FRED B. MUELLER.

Witnesses:
  LEONARD F. MCKIBBEN,
  ERICK F. BRENER.

---

Copies of this patent may be obtained for five cents each, by addressing the "Commissioner of Patents, Washington, D. C."